United States Patent [19]

Munter

[11] Patent Number: 5,400,337
[45] Date of Patent: Mar. 21, 1995

[54] METHOD FOR ATM SWITCH CORE INTERFACE

[75] Inventor: Ernst A. Munter, Kanata, Canada

[73] Assignee: Northern Telecom Limited, Montreal, Canada

[21] Appl. No.: 177,711

[22] Filed: Jan. 5, 1994

Related U.S. Application Data

[63] Continuation of Ser. No. 863,827, Apr. 6, 1992, abandoned.

[51] Int. Cl.⁶ .............................................. H04L 12/56
[52] U.S. Cl. .................................. 370/60.1; 370/94.2
[58] Field of Search ....................... 370/58.1, 58.2, 60, 370/60.1, 94.1, 94.2; 340/825.83

[56] References Cited

U.S. PATENT DOCUMENTS 4,947,388  8/1990  Kurahawa et al. ................. 370/60
5,159,591 10/1992  Gohara et al. ...................... 370/60

*Primary Examiner*—Benedict V. Safourek
*Attorney, Agent, or Firm*—Eliot S. Gerber

[57] ABSTRACT

A method of switching data packets in asynchronous transfer mode (ATM) switches is provided. In order to minimize the functionality of the switch matrix itself, the switch core interface provides momentary physical routing information through the switch core immediately prior to applying a packet to the core.

4 Claims, 4 Drawing Sheets

METHOD FOR ATM SWITCH CORE INTERFACE

This application is a continuation of U.S. application Ser. No. 07/863,827, filed Apr. 6, 1992, now abandoned.

BACKGROUND OF THE INVENTION

This application pertains to subject matter included in U.S. Pat. No. 5,144,619, titled "Common Memory Switch For Routing Data Signals" granted to E. A. Munter, and which is incorporated herein by reference.

1. Field of the Invention

This invention relates to packet switching in general and particularly to a method and apparatus for switch partitioning. More specifically, this invention relates to a method and apparatus for switch partitioning which minimizes the functionality of an asynchronous transfer mode (ATM) cross point matrix to that strictly necessary at the centre of the switch.

2. Prior Art of the Invention

In a paper titled "Architectual And Functional Aspects Of A Multi-Media Packet Switched Network" by Takami, K., et al, Proc. ISS, 1987, the authors discuss a network architecture based upon the core and edge concept, in which the core of the switch offers common functions to all media, while the edge offers media dependent functions. The paper discusses a layered structure of functions for the entire network. And while "core interface" (CI) between the edge and the core is described as using only packet transmission functions, the structure of the CI itself is not discussed in this paper.

In another paper titled "Wideband Packet Technology For Switching Systems" by Luderer, G. W. R., et al, Proc. ISS, 1987, the authors state:

The network hardware can support virtual circuits as well as datagram type services. For the virtual circuits, a logical Channel Number (LCN) is used to represent a destination. To create a new virtual circuit between two AIs [AI: Access Interface], it is necessary to assign LCNs for all links that are used for routing packets for that virtual circuit. The LCN assignments are done by the call processors at the time of call setup. A packet that enters a switch with an LCN number LCN—in leaves the switch with a translated LCN number LCN—out. The LCN translation is done in the trunk controllers by a simple table look-up procedure. The call processor is responsible for updating the translation tables in the trunk controllers. One virtual circuit may pass through several switches and transmission facilities; a packet originating at an AI may therefore use different LCNs along different links that form the path from the source to the destination. A 16-bit LCN field supports 65536 virtual cirsuits per switch; a network of several switches can therefore support a very large number of virtual circuits. It is also possible to implement many other routing techniques; the LCN-based scheme is intended to serve as an example and was actually implemented in some of the early experiements. In order to switch interactive voice signals through a packet network, we used a Time Step (TS) field as a part of the header to facilitate reconstruction of time-critical information. Other fields in the packet header can be used to support applicant-dependent features including a priority field for special services. The next section will address some of these issues in the context of a single packet switch.

The present invention endeavours to provide operator flexibility by isolating the switch matrix from incoming and outgoing LCNs.

SUMMARY OF THE INVENTION

In asynchronous transfer mode (ATM) switching the switch core consists of the ATM crosspoint matrix or "fabric" proper and the high speed links between matrix port cards and multiplexers or format converters (hereinafter the multiplexer or Mux).

It has been found to be desirable that link formats be based on a concept of switch partitioning which minimizes the functionality of the matrix itself to that strictly necessary at the core or centre of the switch, and which delegates translation, integrity, and overload control functions to the multiplexers feeding the switching matrix.

In accordance with the present invention the switching "core" thus defined is surrounded by single or multi-stage concentrators and translators, in preferred implementations all the way out to the ATM format adapters or terminals. Thus, the ATM packet header is layered beginning with the time-division multiplexed (TDM) or local area network (LAN) data stream, towards the switch core via format converters and switch periphals, and outwards again after switching has been accomplished.

It is obvious that a good switch core design should provide high capacity, robustness (particularly against traffic imbalance and overload), and good fault detection and isolation. In order to facilitate attainment of these objections, a switch core interface, according to the present invention, should be the only inter-module interface in which a physical port concept is defined. In a practical embodiment, an upper limit of 256 high speed ports, embedded as 8-bit source and destination fields, was preferred. This allows for growth to about 200 to 500 Gigabits of total switch capacity with available technology.

A further innovation has been introduced by the present invention in order to satisfy another consideration in overall switch design. That is, to avoid, as much as practicable, implementations with a fixed physical hierarchy in order not to compromise future architectural evolution and expansion. The result is introduction of a "logical switch connection number" (SCN), analogous to the link specific "link connection number" (LCN).

Accordingly, there is provided a method for interfacing an incoming data stream with an asynchronous transfer mode (ATM) switch core, comprising: packetizing the incoming data stream into data packets having header and data sections; converting original information in said header section into a logical switch connection number (SCN) and immediately before application of a packet to the ATM switch core converting said logical SCN into physical routing information for routing said packet between selected input and output ports of said ATM switch core, thereby adapting said physical routing information to momentarily available routes between input and output ports of said switch core.

BRIEF DESCRIPTION OF THE DRAWINGS

The preferred embodiment of the present invention will now be described in conjunction with annexed drawings, in which.

DETAILED DESCRIPTION OF THE PREFERRED EMBODIMENT

Figure 1:
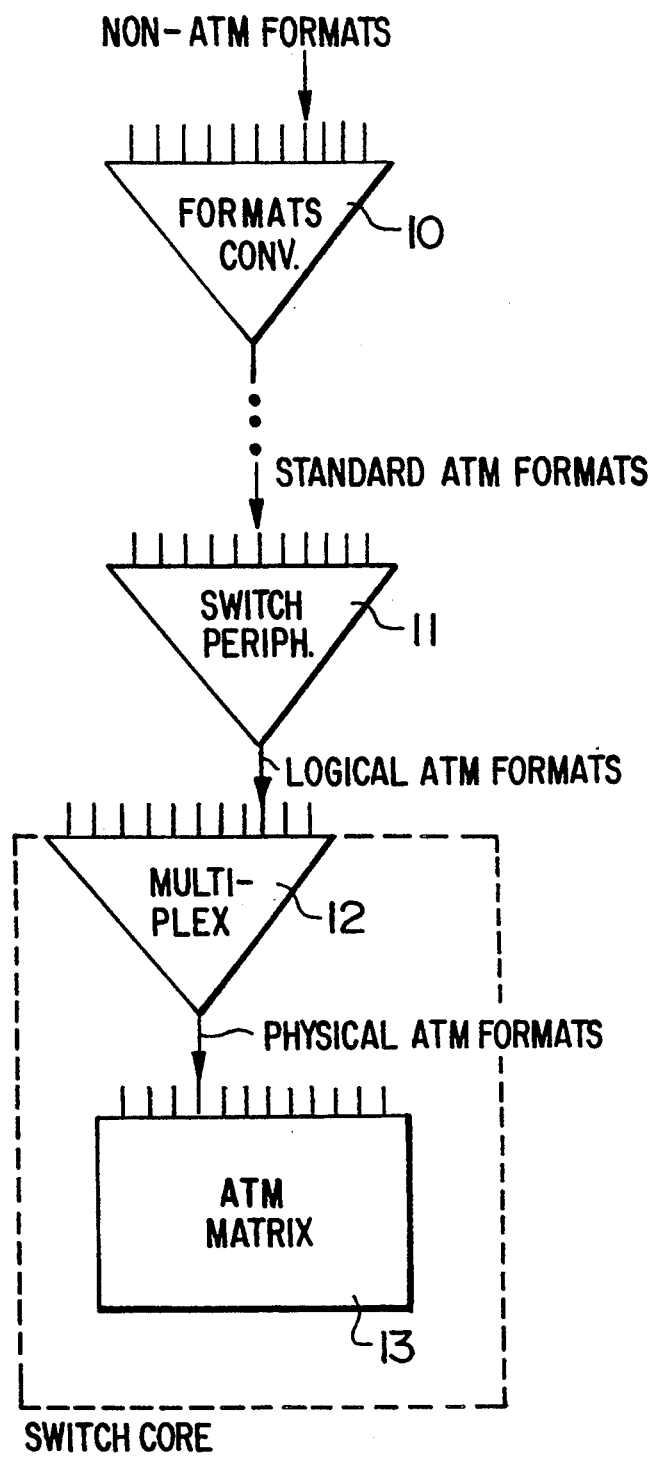
FIG. 1 is a high level block schematic showing the hierarchy in a switching system from incoming data signals to switch matrix.

As shown in FIG. 1, input data in non-ATM formats must first be packetized into standardized ATDM data formats in a format converter 10, the output of which is applied to a switch peripheral 11 where certain packet headers are generated from the input packet. A multiplexer 12 then generates and adds a "physical header" to the data packet before application to the physical switching matrix (or fabric) 13. The physical header actually controls the matrix 13 to switch the entire input data packet to a designated one of its output ports.

Figure 2:
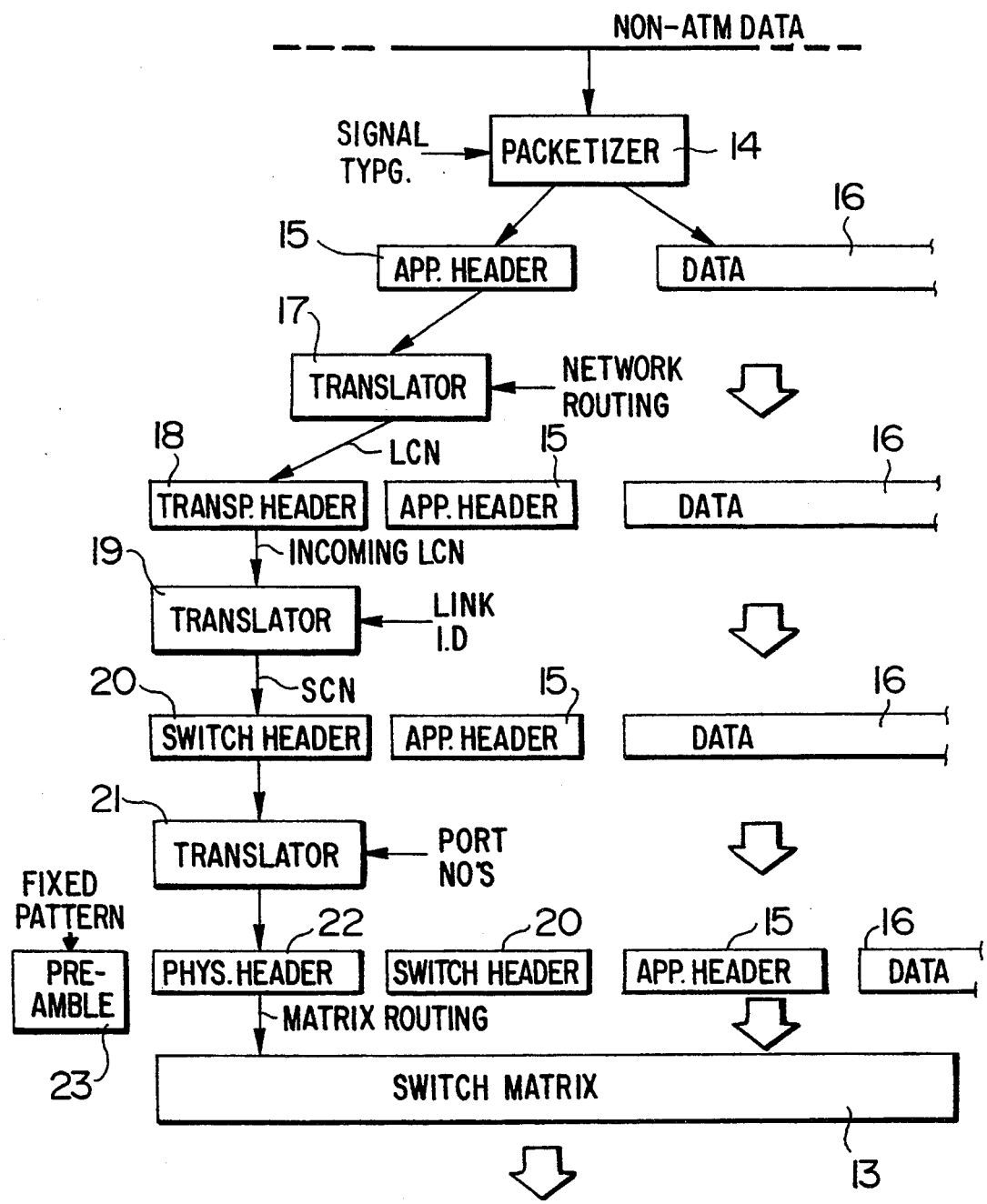
FIG. 2 is a block schematic detailing the signal processing of incoming asynchronous transfer mode (ATM) data to the point of its application to the switch matrix proper.

The process just described is elaborated in FIG. 2. The incoming non-ATDM data, such as TDM or LAN (local area network) data, is applied to packetizer 14, which is configurable depending on the signal type at its input, and which is conveniently a reprogrammable data processor. The data packet generated by the packetizer 14 comprises an application header 15 and data proper 16. The application header, of course, contains a fixed number of data bits specifying, among other things, where the data proper 16 is destined to. A translator 17 having as its controlling input network routing instructions generates from the application header 15 a transport header 18 which specifies a link connection number (LCN). Up to this point the processing of the input data and thereon generated packet is part of the prior art. The transport header 18, providing the incoming LCN, processed in translator 19 which retrieves the link ID to provide a "logical" switch connection number (SCN) and encode it in a switch header 20. A further translator 21 retrieves the corresponding port numbers and converts the switch header 20 to a (non-logical) physical header 22, the bits of which directly control the routing of the entire packet through the actual switching matrix 13. Just before application to the matrix 13, the entire packet has its preamble 23, which is used for clock recovery and for packet identification where necessary.

The introduction of the (logical) switch connection number SCN as an additional "layer" between the (physical) layer necessary to control the matrix 13 and the input (variable) layers isolates the physical layer from the variable layers; thus providing for architectural and expansion flexibility. The translators 17, 19 and 21, conveniently, are software processes or periodically updated look-up tables.

Figure 3:
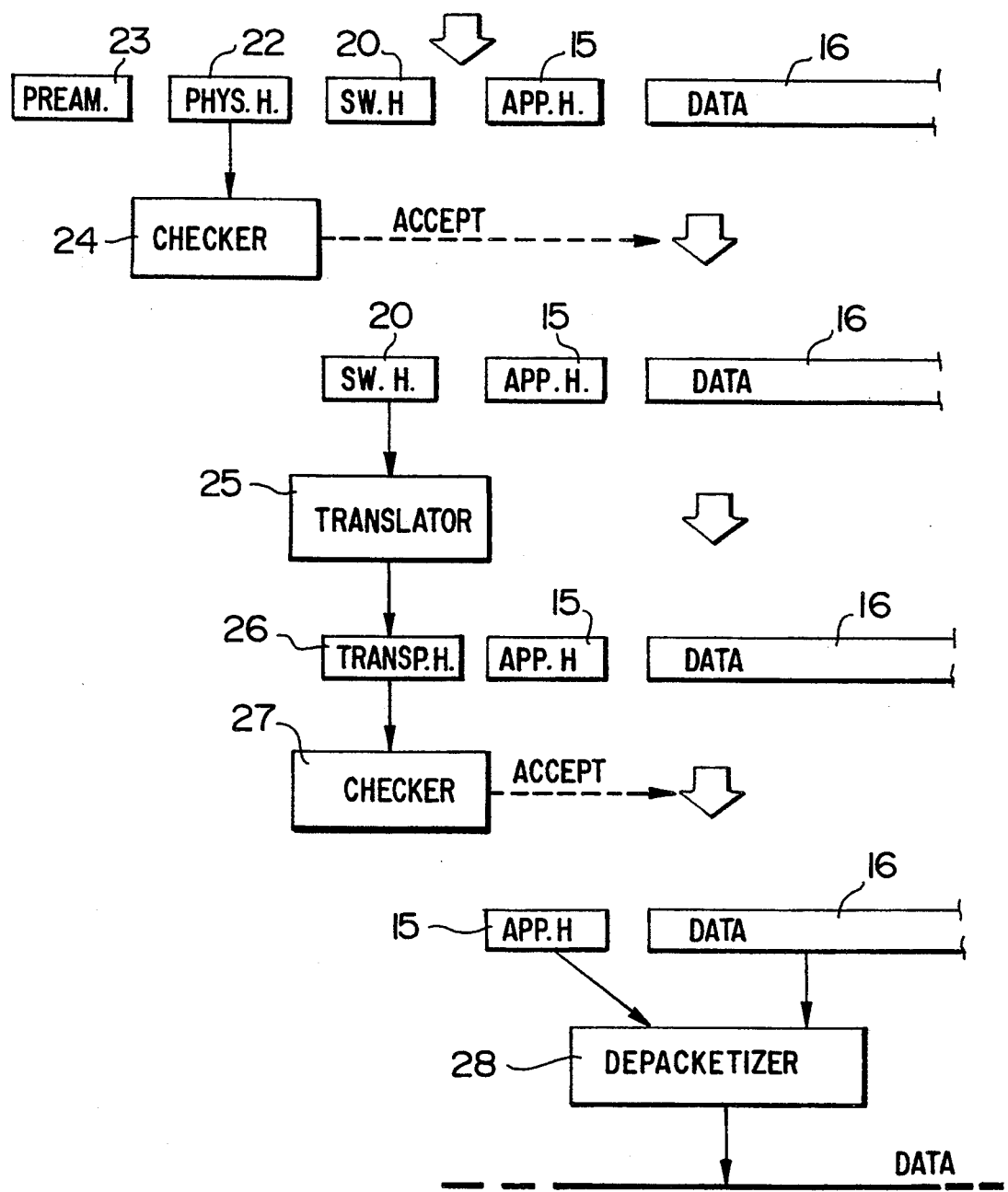
FIG. 3 shows the inverse of the signal processing shown in FIG. 2 as data signals exit the switch matrix to be incorporated into the outgoing ATDM data stream.

Referring now to FIG. 3, once the data packet has been switched to one of the output ports of the switch matrix 13 it is checked by means of checker 24, accepted and stripped of its preamble 23 and physical header 22. The switch header 20 is translated in translator 25 into a (second) transport header 26, which is checked in checker 27, and if accepted is stripped off. The remaining application header 15 and data 16 are "depacketized" in depacketizer 28 before being output into the data stream.

Operation of the "layered" ATM switch core interface system will now be described with reference to FIGS. 2 to 5.

Before elaborating on the ATM packet header layers it should be noted that preferably the logical switch connection number is a conceptually "flat" switch-wide connection number, the length of which in bits determine the number of possible simultaneous switch connections. For example, an SCN of between 24 to 32 bits in length would permit about 16 million to 4 billion simultaneous connections.

As may be seen from the previous discussion, the actual user data 16 in the ATM packet is prefixed by three layers of headers, preceeded by a preamble to provide link synchronization. The preamble 23 comprises 48 bits of which 36 bits are repetitive 0101 . . . clock, and 12 bits are a synchronizing pattern (01111000010).

APPLICATION LAYER

The application layer, represented by the innermost application header 15 is application specific, and is processed at the format conversion point. This header remains unchanged from end to end in a multi node switched connection. In the framed data applications (such as for LAN, HDLC), this layer must specifically contain at least coded information to indicate which part of the message frame is carried in the present packet; the first, the middle, the last, or the only (i.e. first and last) part. In the case of the last or only part, a 6-bit word would indicate the number of valid bytes in the packet, from 1 to a maximum, which for 6-bits is 64 data bytes.

It is preferred that the application specific header be subject to future international standardization and, therefore, may ultimately contain more information. The application header may also not have a fixed length for all applications; although in the present preferred embodiment a 7-bit application header is used. The first bit indicates the start of a message (SOM) (1), or not the start of a message (0), The following 6-bit field encodes a number n from 0 to 56. For $n=0$ all data bytes are significant; for $n=1$ to 56 it means n bytes are significant and end of message (EOM). Values of n above the size of the data field could be used for special purposes, such as indicating non-standard message types or the like.

LOGICAL ROUTING LAYER

The second header layer serves routing, which includes LCNs, and possible priority and route error control features, where desirable. This layer, as it applies to interoffice and access links is also subject to international standardization. Some or all parts of this header change from link to link in a multi-link connection. In the preferred switch implementation, access and trunk peripherals (MUX) process this header. While a form of this header may be usable in the switch core, it is preferrable to separate this function from routing of the packets through the switch itself. The choice is then how much of this header (in terms of bits or bytes) will have to pass through the switch transparently, and how many of the bytes could be discarded at the incoming peripheral and calculated anew at the outgoing peripheral, in order to conserve bandwidth through the switch.

In the switch core this layer will be occupied by the Switch Connection Number (SCN) which will be derived from the incoming LCN, in combination with the physical link identity; it will be carried transparently through the core, and serves to generate the outgoing LCN. Preferrably the SCN, being a switch wide logical number, is also an intermediate address in the translation to a physical route through the switch core (as opposed to direct translation from link LCNs which are physically bound to their links) in order to avoid logical to physical translation to be done in the (possibly remote) link peripherals.

An SCN or its equivalent is also needed at the receiving end in order to distinguish multiple logical calls on the same link, and permit depacketization of messages. In a prototype implementation of the present invention the source field in the physical header (see below) provides this function by having an 8-bit pseudo SCN field.

PHYSICAL ROUTING LAYER

The third layer serves to route packets through the switch components. Routing within MUXes may or may not use prefixed addresses within their equipment in place of address bus signals. In the prior art (Banyan network) routing on prefixed physical headers was one of the key innovations to realize selfrouting networks, especially in the context of cut through switching, i.e. switching the path as soon as the header was received. With the short packets of ATDM, however, this is no longer a significant concern, because the cost of memory for packet buffers is negligible, and the delay incurred by storing a whole packet before switching it diminishes with link speed (500 nanoseconds at 1Gbs).

Now, however, prefixing such physical headers allows the translation function to be moved to the periphery of the switch, ultimately allowing for a higher capacity matrix no matter what the topology or technology.

In the experimental implementation, the physical routing layer comprises a single-bit overflow flag to indicate input buffer overflow, an 8-bit source field (pseudo SCN), an 8-bit destination field, and an 8-bit CRC field (check byte).

The Source Field

The source byte or pseudo SCN identifies the source of the packet for depacketization. In an idle packet it aids in tracing the origin of idle packets for maintenance as well as serving to identify the source of overload bits.

The Destination Field

The destination byte value 255 (hex FF) is reserved to indicate idle packets. Idle packets have valid check bytes and valid source bytes. Otherwise the byte indentifies the matrix port for routing the packet to its destination.

Check Byte Field

Unlike standard ATM header check on external links, the purpose of the check byte in the internal switch core format is not so much to prevent accidental misdelivery of packets due to line errors, but primarily to permit detection and subsequent maintenance of faulty paths. As such, its utility is enhanced if the check byte covers all packet bits, including the data. For a number of reasons, this byte appears in the header (instead of at the end of the packet) which means that the generation of the check byte must be completed before the packet is sent, i.e. another 1 packet delay. In a variable length message frame application as comtemplated no additional time is lost, since this delay is required anyway to determine if a packet is the last of a message frame before its header can be completed.

Figure 4:
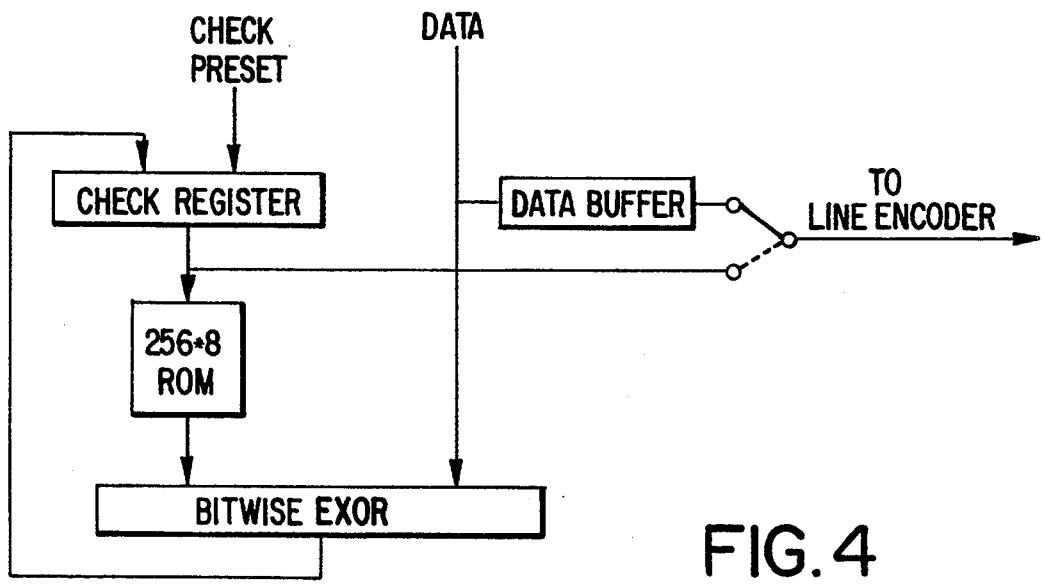
FIG. 4 shows an ATM check byte encoder for use in generating the physical header shown in FIG. 2.

The check byte may be calculated using ROM table lookup as shown in the check byte encoder of FIG. 4, which is self-explanatory. This method allows implementation of CRC (cyclic redundancy check) as well as other algorithms.

Figure 5:
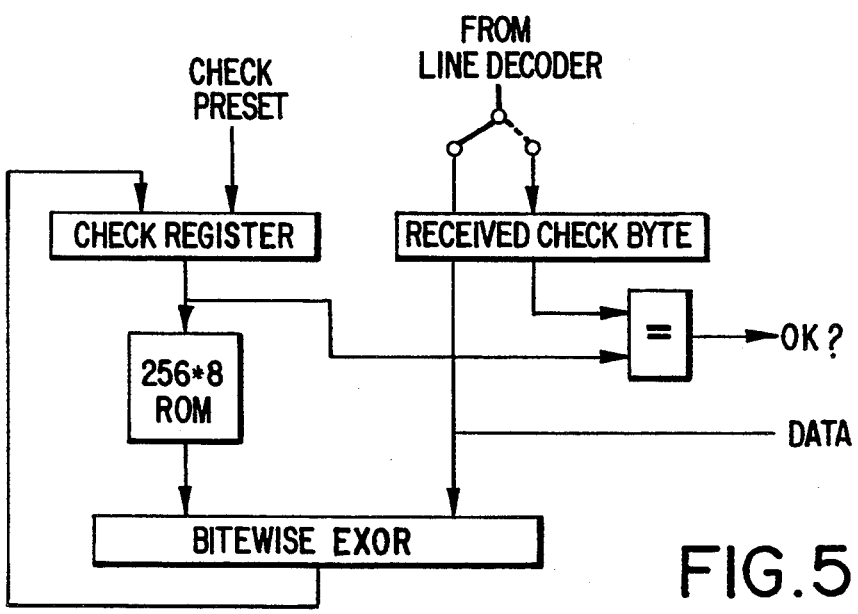
FIG. 5 shows an-ATM check byte decoder for use to check an entire packet to detect faulty paths through the switch matrix as shown in FIG. 3.

A check byte decoder is shown in FIG. 5, which is self-explanatory.

I claim:

1. A method for interfacing an incoming data stream with an asynchronous transfer mode, ATM, switch core, comprising: packetizing the incoming data stream into data packets having destination header and data sections; converting bits in said destination header of each of said data packets into a logical switch connection number, SCN, and immediately before application of each of said data sections to the ATM switch core, converting said logical SCN into physical routing information for routing said each of said data sections between selected input and output ports of said ATM switch core, and using said physical routing information to select momentarily available routes between said selected input and output ports of said switch core.

2. The method for interfacing an incoming data stream with an ATM switch core as defined in claim 1, wherein the step of converting said logical SCN into said physical routing information is accomplished by translating a header containing said logical SCN into a physical header containing said momentarily available routes between pairs of said selected input and output ports of said switch core.

3. The method for interfacing an incoming data stream with an ATM switch core as defined in claim 2, wherein said physical header momentarily controls routing between input and output ports of said switch core.

4. The method for interfacing an incoming data stream with an ATM switch core as defined in claim wherein said physical header is itself routed between input and output ports of said switch core.

* * * * *